United States Patent
Grünberger et al.

(10) Patent No.: US 10,967,575 B2
(45) Date of Patent: Apr. 6, 2021

(54) METHOD AND DEVICE FOR THE GENERATIVE MANUFACTURING OF A THREE-DIMENSIONAL OBJECT

(71) Applicant: EOS GmbH Electro Optical Systems, Krailling (DE)

(72) Inventors: Stefan Grünberger, Munich (DE); Stefan Paternoster, Andechs (DE)

(73) Assignee: EOS GmbH Electro Optical Systems, Krailling (DE)

( * ) Notice: Subject to any disclaimer, the term of this patent is extended or adjusted under 35 U.S.C. 154(b) by 233 days.

(21) Appl. No.: 15/843,229

(22) Filed: Dec. 15, 2017

(65) Prior Publication Data
US 2018/0186077 A1    Jul. 5, 2018

(30) Foreign Application Priority Data

Dec. 29, 2016 (DE) .......................... 102016226322.6

(51) Int. Cl.
B29C 64/295 (2017.01)
B29C 35/08 (2006.01)
(Continued)

(52) U.S. Cl.
CPC .......... *B29C 64/295* (2017.08); *B22F 3/1055* (2013.01); *B29C 35/0805* (2013.01);
(Continued)

(58) Field of Classification Search
CPC .................................................. B29C 64/295
See application file for complete search history.

(56) References Cited

U.S. PATENT DOCUMENTS

| 2008/0131546 A1* | 6/2008 | Perret ................... B22F 3/1055 425/143 |
| 2009/0068376 A1* | 3/2009 | Philippi ................ B29C 64/153 427/532 |

(Continued)

FOREIGN PATENT DOCUMENTS

| DE | 102012212587 | 1/2014 |
| DE | 102014108061 | 12/2014 |

(Continued)

OTHER PUBLICATIONS

On line Wayback Machine capture; LaserFocusWorld; VCSELS for Manufacturing: High-power VCSEL arrays make ideal industrial heating systems, Armand PruijmBoom (Dec. 10, 2014) (Year: 2014).*

(Continued)

*Primary Examiner* — Matthew J Daniels
*Assistant Examiner* — Wayne K. Swier
(74) *Attorney, Agent, or Firm* — Seyfarth Shaw LLP

(57) ABSTRACT

A manufacturing method for generatively manufacturing a three-dimensional object by a layer-by-layer application and selective solidification of a building material. The method includes applying a layer of the building material to a build area by a recoater and selectively solidifying the applied layer of the building material at points corresponding to a cross-section of the object to be manufactured by a solidification device. The steps of applying and solidifying are repeated until the three-dimensional object is completed. A heating element locally introduces thermal energy into the newly applied layer of the building material and/or into the layer of the building material which is already selectively solidified. In the course of this, the thermal energy released by the heating element is adjustable depending on the position of this point in the build area.

12 Claims, 5 Drawing Sheets

(51) Int. Cl.
  *B29C 64/153* (2017.01)
  *B29C 64/165* (2017.01)
  *B22F 3/105* (2006.01)
  *B33Y 10/00* (2015.01)
  *B33Y 30/00* (2015.01)
  *B33Y 40/00* (2020.01)

(52) U.S. Cl.
  CPC .......... *B29C 64/153* (2017.08); *B29C 64/165* (2017.08); *B22F 2003/1056* (2013.01); *B22F 2003/1057* (2013.01); *B22F 2999/00* (2013.01); *B29C 2035/0811* (2013.01); *B29C 2035/0822* (2013.01); *B29C 2035/0838* (2013.01); *B33Y 10/00* (2014.12); *B33Y 30/00* (2014.12); *B33Y 40/00* (2014.12); *Y02P 10/25* (2015.11)

(56) References Cited

U.S. PATENT DOCUMENTS

| | | | | |
|---|---|---|---|---|
| 2011/0165340 A1* | 7/2011 | Baumann | .............. | B29C 35/007 |
| | | | | 427/532 |
| 2015/0202826 A1* | 7/2015 | Paternoster | ........... | B29C 64/153 |
| | | | | 428/474.7 |
| 2015/0251250 A1* | 9/2015 | Schlick | ..................... | B22F 3/24 |
| | | | | 419/29 |
| 2016/0368052 A1* | 12/2016 | Jakimov | ................ | B22F 3/1055 |
| 2017/0021456 A1* | 1/2017 | Varetti | ............... | B23K 15/0026 |
| 2019/0084227 A1 | 3/2019 | Paternoster et al. | | |

FOREIGN PATENT DOCUMENTS

| | | | | |
|---|---|---|---|---|
| DE | 102014204123 | | 10/2015 | |
| DE | 102016105172 A1 * | | 9/2017 | ........... B29C 64/153 |
| DE | 102016203556 | | 9/2017 | |
| EP | 3408074 | | 9/2017 | |
| WO | 2015155745 | | 10/2015 | |
| WO | 2016094827 | | 6/2016 | |

OTHER PUBLICATIONS

Machine Translation DE102016105172 (Year: 2016).*
EP Extended European Search Report for Application No. 17210517.3 dated May 24, 2018, 9 pages.

* cited by examiner

METHOD AND DEVICE FOR THE GENERATIVE MANUFACTURING OF A THREE-DIMENSIONAL OBJECT

TECHNICAL FIELD OF THE INVENTION

The present invention relates to a device and a method for generatively manufacturing a three-dimensional object by a layer-by-layer application and selective solidification of a building material, preferably a powder.

BACKGROUND OF THE INVENTION

Devices and methods of this type are, for instance, used in Rapid Prototyping, Rapid Tooling, or Additive Manufacturing. An example of such a method is known as, selective laser sintering or melting. In the course of this, a thin layer of a building material in powder form is repeatedly applied, and the building material in each layer is selectively solidified using a laser beam by selectively irradiating points corresponding to a cross-section of the object to be manufactured.

DE 10 2016 203 556, which was not yet published at the date of the present application, describes a laser sintering device in which the building material in powder form is applied by means of a recoating unit moving across a build area and is heated by means of a local radiation heater moving behind the recoating unit across the build area.

SUMMARY OF THE INVENTION

It is the object of the present invention to provide an alternative or, respectively, improved device or, respectively, an alternative or, respectively, improved method for generatively manufacturing a three-dimensional object by a layer-by-layer application and selective solidification of a building material, wherein the quality of the heating by means of a heating unit moving behind a recoating unit across a build area is improved.

This object is achieved by a manufacturing method according to claim 1, a computer program according to claim 10, a control device according to claim 11, and a manufacturing device according to claim 12. Further developments of the invention are respectively provided in the dependent claims. In the course of this, the method may also be further developed by the features of the devices provided below or, respectively, set forth in the dependent claims or vice versa, or, respectively, the features of the devices may also be respectively used among themselves for a further development.

The manufacturing method according to the invention serves to generatively manufacture a three-dimensional object by a layer-by-layer application and selective solidification of a building material. The method comprises the steps of applying a layer of the building material to a build area by means of a recoater and selectively solidifying the applied layer of the building material at points corresponding to a cross-section of the object to be manufactured by means of a solidification device. The steps of applying and solidifying are repeated until the three-dimensional object is completed. A heating element which is moved across the build area in a movement direction and is different from the solidification device locally introduces thermal energy into the newly applied layer of the building material and/or into the layer of the building material which is already selectively solidified. In the course of this, the thermal energy released by the heating element at a point of the build area is adjustable or, respectively, adjusted depending on the position of this point in the build area. Thereby, for instance, an inhomogeneity of a temperature distribution in the build area can be easily compensated.

Preferably, the heating power of the heating element is adjustable or, respectively, adjusted depending on the position of the heating element in the movement direction. Thereby, for instance, an inhomogeneity of a temperature distribution in the movement direction can be easily compensated.

Preferably, the heating element has an elongate shape whose longitudinal direction is oriented transversely, preferably perpendicularly, to the movement direction of the heating element, and the heating power of the heating element is adjustable depending on the position in the longitudinal direction of the heating element. Thereby, for instance, an inhomogeneity of a temperature distribution perpendicularly to the movement direction can be easily compensated.

Preferably, the local heating is performed by means of induction and/or radiation. Thereby, for instance, thermal energy can be locally applied to the build area in a simple manner.

Preferably, the recoater is moved in a recoating direction across the build area in order to apply the layer of the building material, and the movement of the heating element is coordinated, preferably coupled, with the movement of the recoater. Thereby, for instance, the heating of the build area can be coordinated with the recoating.

Preferably, the heating element is arranged behind the recoater in the recoating direction. Thereby, for instance, the newly applied layer can be brought to a desired working temperature more quickly.

Alternatively or additionally, the heating element is arranged in front of the recoater in the recoating direction. Thereby, for instance, the underlay, on which the new layer is applied, can be prevented from cooling down too much.

Preferably, the solidification device is moved in a solidification direction across the build area in order to selectively solidify the applied layer, and the movement of the heating element is coordinated, preferably coupled, with the movement of the solidification device. Thereby, for instance, the heating of the build area can be coordinated with the solidification.

Preferably, the recoater is moved in a recoating direction across the build area in order to apply the layer of the building material, the solidification device is moved in the recoating direction across the build area in order to selectively solidify the applied layer, and the heating element is moved between the recoater and the solidification device in the recoating direction across the build area. Thereby, for instance, the building material can be pre-heated after being applied and before being solidified.

The computer program according to the invention is loadable into a programmable control unit and comprises program code means in order to perform all steps of a method according to the invention when the computer program is executed in the control unit. Thereby, for instance, an inhomogeneity of a temperature distribution in the build area can be easily compensated.

The control device according to the invention serves to control a manufacturing device for generatively manufacturing a three-dimensional object by a layer-by-layer application and selective solidification of a building material comprising a recoater for applying a layer of the building material to the build area and a solidification device for selectively solidifying the applied layer at points corresponding to a cross-section of the object to be manufactured. The control device is configured to control the manufacturing device such as to perform a method according to the invention. Thereby, for instance, an inhomogeneity of a temperature distribution in the build area can be easily compensated.

The manufacturing device according to the invention serves to generatively manufacture a three-dimensional object by a layer-by-layer application and selective solidification of a building material. It comprises a recoater for applying a layer of the building material to the build area and a solidification device for selectively solidifying the applied layer at points corresponding to a cross-section of the object to be manufactured. It is configured and/or controlled to repeat the steps of applying and selectively solidifying until the object is completed. The manufacturing device further comprises a heating element which is movable across the build area in a movement direction and is different from the solidification device and which is capable of locally introducing thermal energy into the newly applied layer of the building material and/or into the layer of the building material which is already selectively solidified. The manufacturing device is further configured and/or controlled to introduce the thermal energy such that the thermal energy released by the heating element at a point of the build area depends on the position of this point in the build area. Thereby, for instance, an inhomogeneity of a temperature distribution in the build area can be easily compensated.

Preferably, the heating element has an elongate shape and comprises several individually controllable partial elements in its longitudinal direction. Thereby, for instance, the heating power can be varied in the longitudinal direction of the heating element.

Preferably, the heating element and/or one or more of its partial elements comprises an induction coil, a heating coil, and/or a radiant heater. Thereby, for instance, a local heating element can be easily implemented.

Preferably, the radiant heater comprises a lamp, one or more light-emitting diodes, and/or one or more lasers, wherein the laser or the lasers is preferably formed or are preferably formed as VCSEL or VECSEL. Thereby, for instance, a radiant heater can be easily implemented, in particular a radiant heater formed by several individually controllable partial elements in the longitudinal direction of the heating element.

BRIEF DESCRIPTION OF THE DRAWINGS

Further features and the usefulness of the invention will arise from the description of embodiments on the basis of the accompanying drawings.

DETAILED DESCRIPTION OF THE EMBODIMENTS

Figure 1:
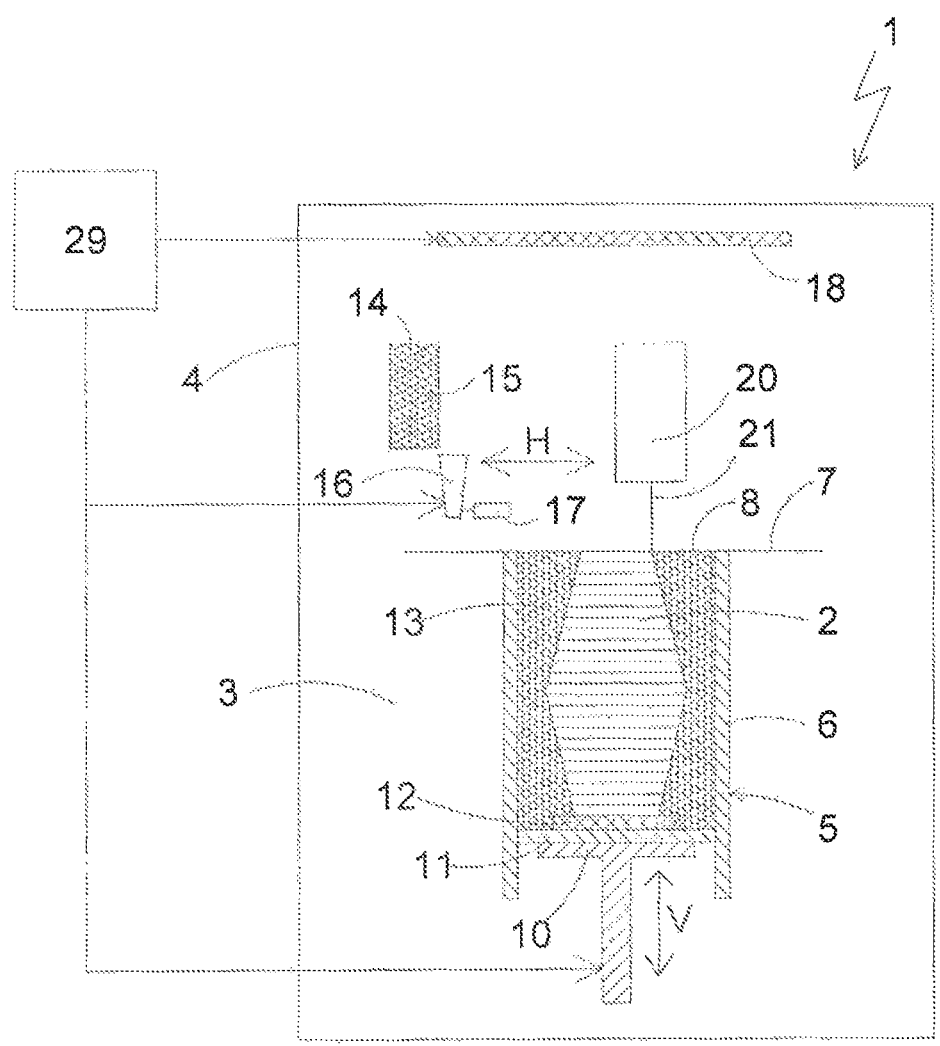
FIG. 1 is a schematic, partially cross-sectional view of a device for generatively manufacturing a three-dimensional object according to the present invention.

In the following, an embodiment of a device 1 according to the present invention is described referring to FIG. 1. The device shown in FIG. 1 is a laser sintering or laser melting device 1. For building up an object 2, it contains a process chamber 3 having a chamber wall 4.

In the process chamber 3, a container 5 open to the top and having a container wall 6 is arranged. By the upper opening of the container 5, a working plane 7 is defined, wherein the region of the working plane 7 lying within the opening which can be used for building up the object 2 is denoted as build area 8.

In the container 5, a support 10 movable in a vertical direction V is arranged at which a base plate 11 is mounted which closes the container 5 in a downward direction and thereby forms its bottom. The base plate 11 may be a plate formed separately from the support 10, which is attached to the support 10, or it may be integrally formed with the support 10. Depending on a powder used and a process, a building platform 12 as a building base on which the object 2 is built up may further be mounted on the base plate 11. However, the object 2 may also be built up on the base plate 11 itself, which then serves as a building base. In FIG. 1, the object 2 to be built in the container 5 on the building platform 12 is shown below the working plane 7 in an intermediate state having several solidified layers surrounded by building material 13 remaining non-solidified.

The laser sintering device 1 further contains a storage container 14 for a building material 15 in powder form which can be solidified by an electromagnetic radiation and a recoater 16 movable in a horizontal direction H for applying the building material 15 within the build area 8. Preferably, the recoater 16 extends transversely to its movement direction over the total region to be recoated. A local heating element 17 for heating the layer applied by the recoater 16 is mounted to the recoater. The local heating element 17 may be formed as a radiant heater, for instance, as an infrared radiator.

Optionally, a global radiant heater 18 is arranged in the process chamber 3, serving for heating the applied building material 15. For instance, an infrared radiator may be provided as global radiation heater 18.

The laser sintering device 1 further contains an exposure device 20 also movable in a horizontal direction H which generates a laser radiation 21 focused onto the working plane 7. The exposure device 20 is preferably designed as a row exposure device which is capable of exposing a line extending transversely to its movement direction, the line extending over the total region to be exposed.

The laser sintering device 1 further contains a control unit 29 via which the individual components of the device 1 are controlled in a coordinated manner for performing the building process. Alternatively, the control unit may also be placed partially or completely outside the device. The control unit may contain a CPU whose operation is controlled by a computer program (software). The computer program may be stored separately from the device on a storage medium, from which it can be loaded into the device, in particular, into the control unit 29.

During operation, first, the support 10 is lowered for the application of a powder layer by a height corresponding to the desired layer thickness. The recoater 16, first, moves to the storage container 14 and receives from it an amount of the building material 15 sufficient for applying a layer. Then it moves across the build area 8 and applies there a thin layer of the building material 15 in powder form onto the building base or an already previously existing powder layer. The application is performed at least over the total cross-section of the object 2 to be manufactured, preferably across the whole build area 8, i.e. the region confined by the container wall 6. The building material 15 in powder form is preheated by means of the local heating element 17 to a working temperature. Optionally, the building material 15 in powder form is additionally heated by means of the global radiation heater 18.

Subsequently, the exposure device 20 moves across the applied and preheated powder layer and solidifies the building material in powder form at the points corresponding to the cross-section of the object 2 to be manufactured in that it selectively irradiates these points by the laser radiation 21. In the course of this, the powder grains at these points are partially or completely melted on by the energy supplied by the radiation, so that, after a cooling down, they are interconnected forming a solid body. These steps are repeated as long as until the object 2 is completed and can be removed from the process chamber 3.

The local heating element 17 has an elongate shape whose longitudinal axis extends transversely, preferably perpendicularly, to the movement direction of the recoater 16. The length of the local heating element 17 corresponds to the dimension of the build area 8 transversely to the movement direction of the recoater 16. Thus, during its movement across the build area 8, the heating element can locally introduce thermal energy at each point of the build area.

In the course of this, the local heating element may be arranged behind the recoater 16 in a movement direction of the recoater 16 in order to heat the newly applied layer and thus, for instance, bring it more quickly to a desired working temperature. Alternatively to this, the local heating element 17 may also be arranged in front of the recoater 16 in the movement direction and heat the underlayer, on which the new layer is applied, whereby it is, for instance, less cooled by the application of the new powder layer. Also a combination of the two arrangements is possible in order to achieve both effects. When the recoater 16 is configured for a recoating in two opposite directions, preferably, a heating element 17 is arranged on both sides. In the course of this, the leading heating element 17, the heating element 17 lagging behind, or both are selectively actuated depending on the movement direction of the recoater 16.

Alternatively, the heating element may be arranged at the exposure device on one side or both sides, or it may be movable separately from the two across the build area. In the course of this, the movement of the heating element may be coordinated, preferably coupled, with the movement of the recoater and/or the exposure device. The heating element may be moved across the build area in front of the recoater and/or between the recoater and the exposure device and/or behind the exposure device.

Figure 2A:
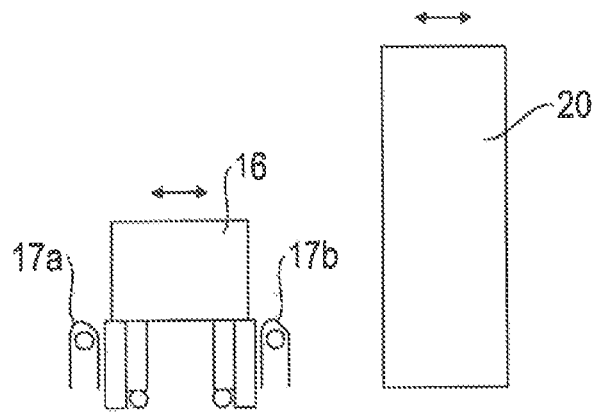
FIGS. 2A to 2D are schematic side views of examples of the arrangement of a heating element contained in the device of FIG. 1.
Figure 2B:
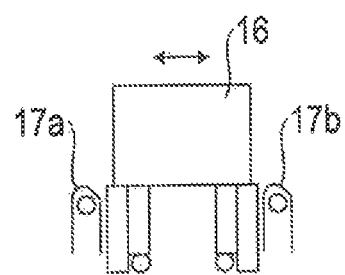
Figure 2C:
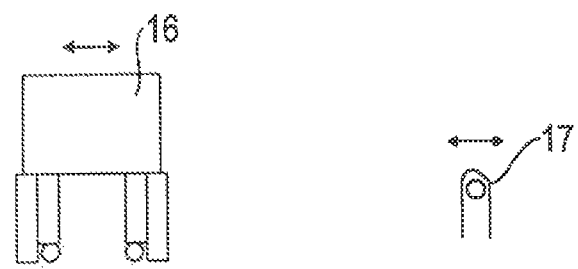
Figure 2D:
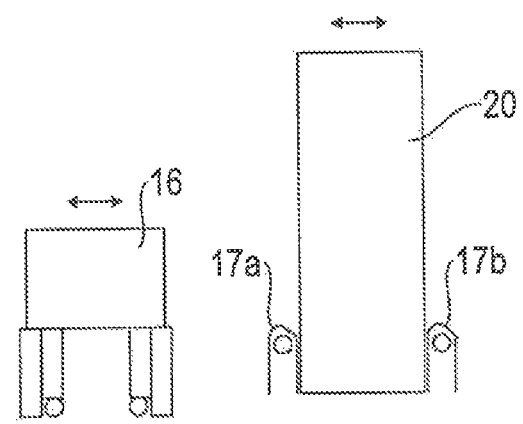
Figure 3A:
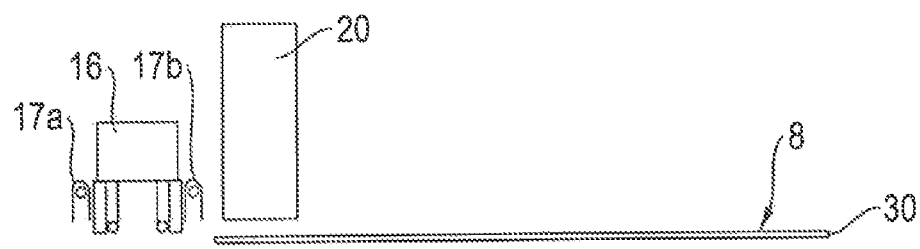
FIGS. 3A to 3E are schematic side views showing the control of the heating element contained in the device of FIG. 1 during the movement across a build area.
Figure 3B:
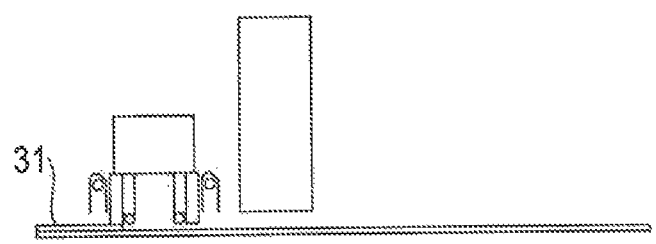
Figure 3C:
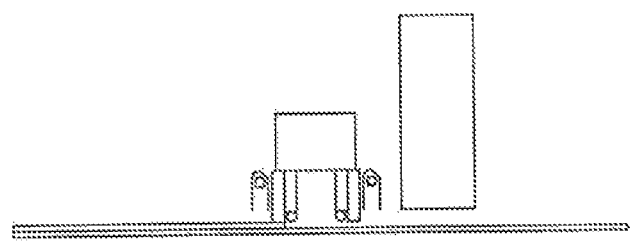
Figure 3D:
Figure 3E:

FIG. 2 shows non-restrictive examples of the arrangement of the heating element at the recoater (FIGS. 2A and 2B), at the exposure device (FIG. 2D), and separately from the two (FIG. 2C).

In the course of this, according to the present invention, the local heating element 17 is controlled during its movement across the build area such that the thermal energy released thereby at a point of the build area 8 is dependent on the position of this point in the build area. Thus, not a constant heating power is released at all points, but it is varied depending on the position. This may be implemented in different manners.

In a first version, the characteristics of the heating power over time can be varied when the heating element 17 moves in the movement direction of the recoater 16. This results in that the heating element 17 can introduce different amounts of thermal energy at different positions of the build area lying at a distance from each other in the movement direction of the recoater 16.

FIGS. 3A-E illustrate this course of action. The recoater 16 moves across the build area 8 and, in the course of this, applies a new powder layer 31 onto the surface of a powder bed 30 formed by the previously applied powder layers. In the course of this, the heating element 17b of the two heating elements mounted on both sides of the recoater 16 which lies ahead in the movement direction is controlled such that its heating power, symbolized by the line width of the circumference of the circle, increases from step a to step d and, thereafter, decreases again in step e.

However, in a second version, the heating element may also be controlled such that it does not release the same power across the whole of its length, but that the characteristics of the heating power is changed across the length of the heating element. This may, for instance, be implemented in that the heating element comprises several individually controllable partial elements in its longitudinal direction. This results in that the heating element 17 can introduce different amounts of thermal energy at different positions of the build area lying at a distance from each other in a direction perpendicular to the movement direction of the recoater 16.

Figure 4:
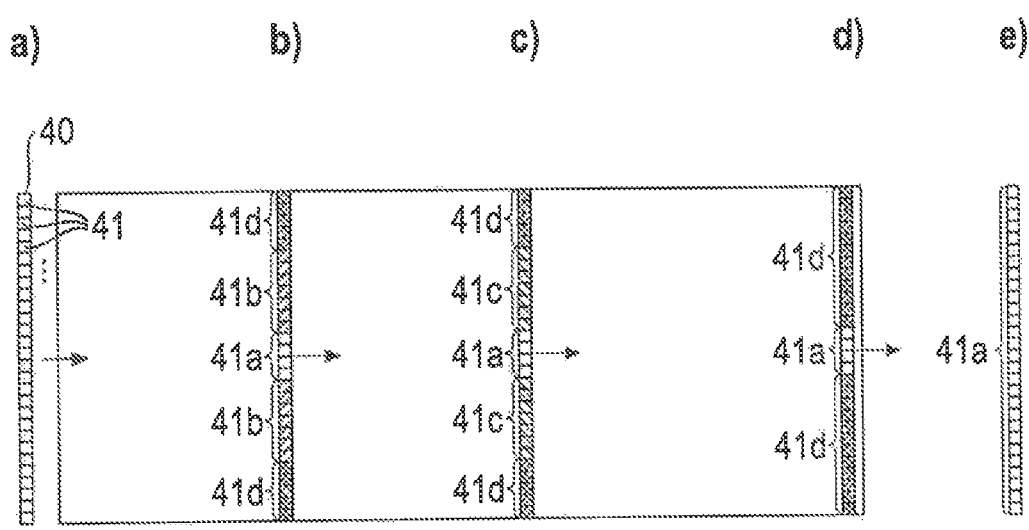
FIG. 4 is a schematic view from below of a heating element usable within the framework of the invention, subdivided into individual heating segments.
Figure 5A:
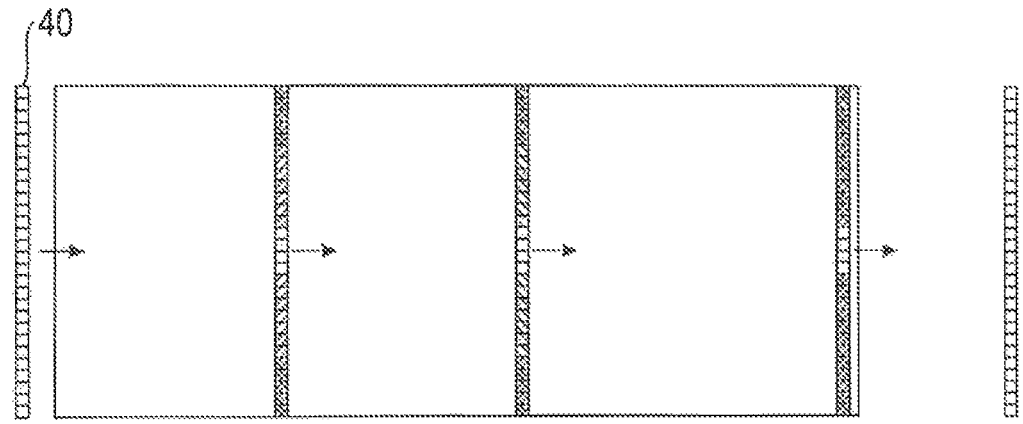
FIGS. 5A to 5E are schematic side views showing the control of the heating element shown in FIG. 4 during the movement across the build area within the framework of the implementation of an embodiment of the method according to the invention.
Figure 5B:
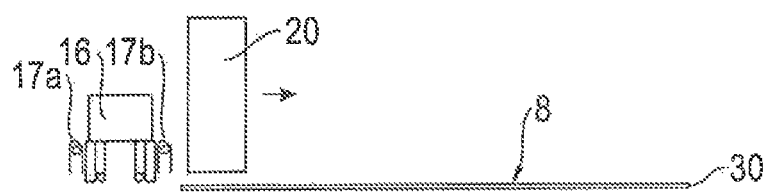
Figure 5C:
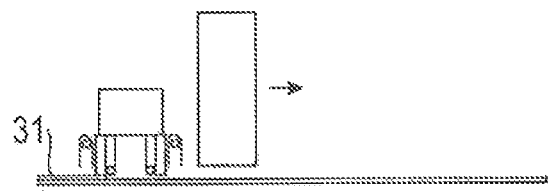
Figure 5D:
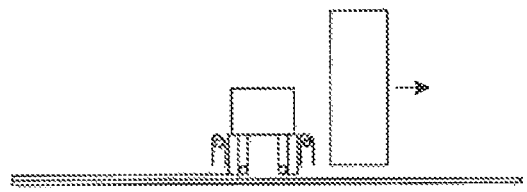
Figure 5E:

FIG. 4 shows such a segmented heating element 40, subdivided into individually controllable heating segments 41 at steps a-e. FIG. 4 shows different actuations of the individual heating segments. Therein, heating elements are denoted by 41a to 41d that are actuated by respectively the same heating power which is, however, different compared to other heating elements. In the course of this, heating elements 41a have the lowest heating power and heating elements 41d have the highest heating power. Thus, different heating power profiles may be implemented along the longitudinal direction of the segmented heating element 40.

Both versions (as described on the basis of FIGS. 3 and 4) may also be combined with each other, so that the heating power can be separately adjusted for each position in the two-dimensional build area.

FIG. 5 illustrates this course of action. At the top, a representation of the segmented heating element 40 corresponding to FIG. 4 is shown once again from below. The recoater 16 moves across the build area 8 and, in the course of this, applies a new powder layer 31 onto the surface of a powder bed 30 formed by the previously applied powder layers. In the course of this, of the two heating elements mounted on both sides of the recoater 16, the heating element 17b lying ahead in the movement direction is controlled such that its heating power has the power distribution respectively shown in FIG. 4 from step a to step e. This results in that the heating power of the heating segments lying on both sides of the central heating segments actuated by low power increases from step a to step d and, thereafter, decreases again in step e.

By adjusting the heating power of the heating element 17 depending on the position in the build area 8, it is possible to purposefully compensate for an inhomogeneity of the temperature distribution in the build area 8 in a simple manner during the heating by the heating element 17. Such an inhomogeneity arises, for instance, due to the general machine design, the type of the process control, an inhomogeneity of the radiation distribution of the global radiation heater 18 and its different exposure time on the newly applied layer depending on a position in the movement direction of the recoater 16 etc. Further, the local temperature at a position of the build area also depends on whether a solidification by the laser has taken place there in the previous layer or not.

This inhomogeneity of the temperature distribution can, for instance, be determined by means of a position-resolving temperature measurement directly during the manufacturing process and the heating element be correspondingly controlled. However, the control of the heating element can also be performed without a permanent temperature measurement, wherein the heating power needed at each position may be respectively calculated from empirical data, the irradiation data (e.g. position, focus diameter, laser power and the like), and the process run (e.g. position of the point in the movement direction of the recoater).

By improving the homogeneity of the temperature distribution across the build area, for instance, the manufacturing process can be performed in a more reproducible manner and, thus, the quality of the manufactured object can be improved.

The local heating by the heating element may, for instance, be performed by means of induction and/or radiation. So, the heating element may, for instance, comprise an induction coil and/or a heating coil instead of or additionally to the radiation heater described above. The radiation heater may comprise a lamp, one or more light-emitting diodes, and/or one or more lasers, wherein the laser or the lasers may be preferably formed as VCSEL or VECSEL.

Even though the present invention has been described on the basis of a laser sintering or, respectively, laser melting device, it is not limited to the laser sintering or laser melting. It may be applied to arbitrary methods of generatively manufacturing a three-dimensional object by a layer-by-layer application and selective solidification of a building material.

Instead of an exposure device moving across the build area, for instance, also a fixed irradiator having one or more scanner heads whose laser beams scan the build area may be used. As a laser, for instance, one or more gas or solid state lasers or any other type of lasers, such as e.g. laser diodes, in particular VCSEL (Vertical Cavity Surface Emitting Laser) or VECSEL (Vertical External Cavity Surface Emitting Laser) or a row of these lasers may be used. Generally, any device by means of which energy can be selectively applied to a layer of the building material as wave or particle radiation may be used as exposure device. Instead of a laser, for instance, another light source, an electron beam, or any other energy or, respectively, radiation source may be used which is suitable for solidifying the building material. Instead of deflecting a beam, also irradiating using a movable row exposure device may be applied. The invention may also be applied to the selective mask sintering, where an extended light source and a mask are used, or to the High-Speed-Sintering (HSS), where a material is selectively applied onto the building material which material enhances (absorption sintering) or reduces (inhibition sintering) the absorption of radiation at the corresponding points and then an irradiation is performed non-selectively in a large-area manner or using a movable row exposure device.

Instead of supplying energy, the selective solidification of the applied building material may also be performed by 3D-printing, for instance, by applying an adhesive. Generally, the invention relates to generatively manufacturing an object by means of a layer-by-layer application and selective solidification of a building material, independently of the manner in which the building material is being solidified.

As building material, various materials may be used, preferably powder, in particular, metal powder, plastic powder, ceramic powder, sand, filled or mixed powders.

The invention claimed is:

1. A manufacturing method for generatively manufacturing a three-dimensional object by layer-by-layer application and selective solidification of a building material, comprising the steps of:
    applying a layer of the building material to a build area by means of a recoater moving in a movement direction across the build area;
    selectively solidifying the applied layer of the building material at points corresponding to a cross-section of the object to be manufactured by means of a solidification device;
    repeating the steps of applying and solidifying until the three-dimensional object is completed; and
    moving a first heating element and a second heating element in the movement direction across the build area, the first and second heating element being different from the solidification device, the first heating element being arranged behind the recoater in the movement direction and locally introducing thermal energy into the newly applied layer of the building material at any point of the build area and the second heating element being arranged in front of the recoater in the movement direction and introducing thermal energy into the layer of the building material which has been already selectively solidified at any point of the build area,
    the solidification device being moved in use in a solidification direction across the build area back and forth from one end of the build area to an opposite end of the build area in order to selectively solidify the applied layer;
    the first and/or the second heating elements are moved together with the solidification device; and
    wherein the thermal energy released by the first and the second heating elements at a specific point of the build area is adjustable depending on a position of the specific point in the build area.

2. The manufacturing method according to claim 1, wherein a heating power of the first and the second heating elements is adjustable depending on the position of the heating element in the movement direction.

3. The manufacturing method according to claim 1, wherein
    the first and/or the second heating element has an elongate shape whose longitudinal direction is oriented transversely to its movement direction; and
    the heating power of the heating element is adjustable depending on a position in the longitudinal direction of the heating element.

4. The manufacturing method according to claim 1, wherein the step of locally introducing thermal energy is performed by means of induction and/or radiation.

5. The manufacturing method according to claim 1, wherein:
    the recoater is moved in a recoating direction across the build area in order to apply the layer of the building material; and
    the movement of the first and the second heating elements is coordinated with the movement of the recoater.

6. The manufacturing method according to claim 1, wherein
the solidification device is moved in a solidification direction across the build area in order to selectively solidify the applied layer; and
the movement of the first and/or the second heating element is coordinated with the movement of the solidification device.

7. The manufacturing method according to claim 1, wherein
the recoater is moved in a recoating direction across the build area in order to apply the layer of the building material;
the solidification device is moved in the recoating direction across the build area in order to selectively solidify the applied layer; and
the first heating element or the second heating element is moved between the recoater and the solidification device in the recoating direction across the build area.

8. The manufacturing method according to claim 1, wherein at least one of the first and the second heating elements has an elongate shape and comprises several individually controllable partial elements in its longitudinal direction.

9. The manufacturing method according to claim 1, wherein at least one of the first and the second heating elements and/or one or more partial elements of the first or second heating elements comprises an induction coil, a heating coil, and/or a radiation heater.

10. The manufacturing method according to claim 1, wherein
at least one of the first and the second heating elements comprises a lamp, one or more light-emitting diodes, and/or one or more lasers, wherein the laser or the lasers is/are formed as VCSEL or VECSEL.

11. A manufacturing method for generatively manufacturing a three-dimensional object by layer-by-layer application and selective solidification of a building material, comprising the steps of:

applying a layer of the building material to a build area by means of an elongated recoater which extends across the build area and moves across the build area in applying a layer of the building material;
selectively solidifying the applied layer of the building material at points corresponding to a cross-section of the object to be manufactured by means of a solidification device, the solidification device moving in a solidification direction across the build area in order to selectively solidify the applied layer; and
repeating the steps of applying and solidifying until the three-dimensional object is completed,
wherein a first and a second elongated heating element different from the solidification device is provided at the solidification device and moves in the solidification direction across the build area with the solidification device, the first heating element being arranged along one side of the recoater and the second heating element being arranged along an opposite side of the recoater, the first and second heating elements locally introducing thermal energy into the newly applied layer of the building material and/or into the layer of the building material which has been already selectively solidified at any point of the build area;
the solidification device being moved in use in a solidification direction across the build area back and forth from one end of the build area to an opposite end of the build area in order to selectively solidify the applied layer;
the first and the second heating elements are moved together with the solidification device; and
wherein the thermal energy released by the heating element at a specific point of the build area is adjustable depending on the position of the specific point in the build area.

12. The method of claim 11 wherein the first and the second heating elements each has a plurality of individually controllable partial heating elements along its elongated length extending across the build area.

* * * * *